United States Patent [19]

Krauss et al.

[11] 4,377,396
[45] Mar. 22, 1983

[54] PROCESS OF PURIFYING EXHAUST AIR LADEN WITH ORGANIC POLLUTANTS

[75] Inventors: Reinhard Krauss, Holzgerlingen; Horst-Dieter Maass, Stuttgart; Hans-Werner Bräuer, Butzbach, all of Fed. Rep. of Germany

[73] Assignee: Metallgesellschaft AG, Frankfurt am Main, Fed. Rep. of Germany

[21] Appl. No.: 324,213

[22] Filed: Nov. 23, 1981

Related U.S. Application Data

[63] Continuation of Ser. No. 161,099, Jun. 19, 1980, abandoned.

[30] Foreign Application Priority Data

Jun. 27, 1979 [DE] Fed. Rep. of Germany ....... 2925864

[51] Int. Cl.³ .............................................. B01D 53/04
[52] U.S. Cl. .......................................... 55/59; 55/74
[58] Field of Search ............................. 55/59, 68, 74; 252/411 R, 444

[56] References Cited

U.S. PATENT DOCUMENTS

| 1,420,613 | 6/1922 | Voress et al. | 55/59 X |
| 1,453,215 | 4/1923 | Voress et al. | 55/59 X |
| 1,595,683 | 8/1926 | Burrell et al. | 55/59 |
| 1,753,067 | 4/1930 | Ray et al. | 55/59 X |
| 1,905,900 | 4/1933 | Carlisle et al. | 55/59 X |
| 2,379,518 | 7/1945 | Hall | 55/27 X |
| 3,596,436 | 8/1971 | Dassesse | 55/59 X |
| 3,955,944 | 5/1976 | Grant | 55/74 |
| 4,056,369 | 11/1977 | Quackenbush | 55/74 X |
| 4,203,734 | 5/1980 | Winter et al. | 55/74 X |

OTHER PUBLICATIONS

Kirk–Othmer, Encyclopedia of Chemical Technology, vol. 1, pp. 149–156, (1964) and vol. 18, pp. 559 & 560, (1969).

*Primary Examiner*—Robert H. Spitzer
*Attorney, Agent, or Firm*—Sprung, Horn, Kramer & Woods

[57] ABSTRACT

A process of purifying exhaust air which contains organic pollutants, particularly exhaust air from paint-drying operations, comprises adsorption on particulate activated carbon, which is contained in a fixed bed and from which at least part of the adsorbate can be desorbed. The activated carbon has a particle size in the range of about 2 to 6 mm, a bulk density of 250 to 450 g/l and B.E.T. surface area of 800 to 1800 m²/g and the activated carbon is subjected to a desorbing treatment with steam while the bed of activated carbon is maintained at temperatures of 100° to 150° C.

4 Claims, No Drawings

PROCESS OF PURIFYING EXHAUST AIR LADEN WITH ORGANIC POLLUTANTS

This is a continuation, of application Ser. No. 161,099, filed June 19, 1980, now abandoned.

BACKGROUND OF THE INVENTION

This invention relates to a process of purifying exhaust air which is laden with organic pollutants, particularly exhaust air from paint-drying operations, comprising an adsorption on particulate activated carbon, which is contained in a fixed bed and from which at least part of the adsorbate can be desorbed.

It is known to feed exhaust air of the above-mentioned kind of a furnace, in which the pollutants are burnt without a residue at temperatures of 750° to 850° C. The resulting hot exhaust gases may then be used, e.g., to heat the paint dryers and to preheat the exhaust air which is to be purified.

Another known process comprises an adsorption of the pollutants on activated carbon. Activated carbon has been used for a long time particularly for the removal of organic solvents having boiling points up to about 140° C. When the activated carbon has been exhausted, i.e., when it is laden to saturation, it is regenerated by a treatment with hydrogen to remove the adsorbate. It has not been possible before to use this regeneration in connection with the purification of exhaust air from paint-drying operations.

Exhaust air from paint-drying operations contains various substances from different paint coats or from additional protective layers, such as an underbody coating. For this reason the pollutants contained in the exhaust air include solvents and plasticizers. Most of these substances have boiling points in the range of about 150° to 220° C.

But even under a reduced pressure of 25 millibars, the plasticizers which are used do not boil at temperatures below 255° to 265° C. During the baking of the coats, said substances enter the exhaust air from the dryers and are subsequently adsorbed on the activated carbon. Besides, cracked and polymerized products are formed at an uncontrolled rate and are also adsorbed on the activated carbon.

For these reasons it can be understood that it was previously believed that very high temperatures were required to regenerate activated carbon laden with such substances. To prevent a burning of the activated carbon, care had to be taken to ensure that the desorbing gas is virtually free from oxygen. In the known process, the activated carbon was regenerated by a treatment with hot inert gases, which were produced, e.g. by a combustion of propane or fuel oil and were at temperatures of about 500° C. The laden desorbing gases were fed to a thermal combustion plant. A process based on this principle has been described in the periodical "Oberflache+JOT" (1978) on pages 775 to 777.

It has been found that in that known process the bulk density of the carbon increases progressively in spite of the high desorption temperatures because the quantity of non-desorbable matter increases steadily. As a result, the time until the activated carbon is fully laden decreases from cycle to cycle. The increase of the bulk density of the carbon as a result of the deposition of polymerized products on the carbon can be compensated in that the carbon is re-activated at temperatures of about 750° C., although this is accompanied by a burning of carbon. For such re-activation, it is also necessary either to discharge the spent activated carbon from the adsorber and to re-activate the carbon externally in a special furnace, or to design the adsorbers also as re-activating furnaces. In the first case, a substantial proportion of fines will be braded from the carbon in transit; that proportion may amount to some percent per re-activation. The second alternative involves a high expenditure of expensive refractories. In both cases, additional losses are due to the inevitable burning of activated carbon.

SUMMARY OF THE INVENTION

It is an object of the invention to avoid these disadvantages and to combine an effective purification with a simple desorbing treatment of the activated carbon. In the process described first hereinbefore this is accomplished according to the invention in that the activated carbon has a particle size in the range of about 2 to 6 mm, a bulk density of 250 to 450 grams per liter and a B.L.T. surface area of 800 to 1800 m$^2$/g and that the activated carbon is subjected to a desorbing treatment with steam while the bed of activated carbon is maintained at temperatures of 100° to 150° C.

In that process the use of the conventional inert gas for desorbing the activated carbon is abandoned. The special activated carbon which is used can be subjected to an effective desorbing treatment at surprisingly low temperatures in the bed of activated carbon. It may be useful to employ activated carbon in the form of rods having a ratio of diameter to length in the range of from 1:1 to 1:4.

Pollutants having relatively high boiling points can be removed from the activated carbon in spite of the low desorption temperature. The pollutants desorbed from the activated carbon have preferably a modal boiling point in the range of 160° to 200° C., and at least 60% by weight of the desorbed pollutants have a boiling point of at least 170° C. The results constitute a special advantage afforded by the process.

In some cases it is recommended to subject the exhaust air to an indirect cooling to temperatures between 20° to 80° C. and to separate pollutant-containing condensate from the cooled exhaust air before the latter is contacted with the activated carbon bed for adsorption. Particularly plasticizers may be removed from the exhaust air by this cooling. In principle, the cooling of the exhaust air before the adsorption may be effected by scrubbing although dry cooling will generally be more desirable because it will eliminate the need to purify the aqueous effluent which necessarily becomes available during the scrubbing.

Exhaust air from paint-drying operations such as are carried out in the automobile industry contain various organic pollutants having boiling points in the range of about 50° to 250° C. In most cases the exhaust air contains up to 3000 mg organic-pollutant carbon per m$^3$. Such exhaust air can be purified in a surprisingly simple and inexpensive manner by the process described hereinbefore. The desorbing steam required per hour amounts to 50 to 300 kg per m$^2$ of bed surface area.

EXAMPLE

Exhaust air at a rate of 700 m$^3$/h becomes available as a result of the drying of spray-painted and underbody coats in an automobile-manufacturing plant. The exhaust air contains solvents and plasticizers as well as unidentified substances in a concentration which varies between 2000 and 3000 mg organic-pollutant carbon per m$^3$. The exhaust air has initially a temperature of about 80°. In a scrubbing stage and a succeeding dry filter, the air is cooled to 35° C. and a certain percentage of the pollutants therein, particularly plasticizers, is then removed. The air which is virtually saturated with water vapor is then forced by a blower through the fixed bed of activated carbon. The adsorbent bed is 0.6 m in diameter and has a height of 2 m. The bed consists of activated carbon rods, which are 4 mm in diameter and have a length of 6 mm. The activated carbon has a B.E.T. surface area of about 1300 m$^2$/g and a bulk density between 300 and 350 g/l.

The adsorption treatment is interrupted when pollutants pass through the bed at a rate of about 150 mg/m$^3$. The activated carbon is then desorbed by a treatment with steam while the activated carbon bed is maintained at a temperature between 105° to 120° C. Nevertheless, it is possible to desorb the adsorbate to such a degree that the bulk density does not rise above a certain base loading. The adsorption capacity of the carbon, measured over the benzene isothermal line, remains unchanged too. It has also been found that the desorption under the favorable conditions does not result in polymerization or pyrolysis reactions or other deteriorating effects on the carbon. The formation of acids as a result of decomposition or oxidation is also extremely small.

The result mixture of steam and desorbate is first subjected to a condensing step by which the desorbed solvents can be completely recovered. Examinations of the organic phase of the desorbed condensate show that the highest boiling point of the desorbate is about 175° C. and that 85% of the desorbate has a boiling point of or above 170°. The desorbate is clear as water and almost colorless so that it can be re-used as a purifying agent. This shows that in spite of the low desorption temperatures the solvents boiling at much higher temperatures are also desorbed from the activated carbon.

The rate at which steam is used for desorption was also varied during the experiments. Best results are obtained when the steam is used at an hourly rate or 95 to 185 kg per m$^2$ of bed surface area. A lower or higher steam rate will not produce improved results but will result in a lower quality of the desorbed carbon, even if the duration of the desorption treatment is varied accordingly.

In various experiments, the conditions of the pre-purification of the exhaust air before its contact with the bed of activated carbon was changed too. The exhaust air is now passed through an indirect air cooler and through a succeeding mist separator. When the cooler surfaces have become soiled by deposited pollutants particularly plasticizers, these were periodically removed by melting treatment with steam. In this method of pre-purifying the exhaust air, no polluted aqueous effluent will become available. The purification of such effluent would present another problem.

It will be appreciated that the instant specification and example are set forth by way of illustration and not limitation, and that various modifications and changes may be made without departing from the spirit and scope of the present invention.

What is claimed is:

1. A process for purifying exhaust air from organic pollutants which exhaust air is obtained in an automobile manufacturing plant from a paint drying and underbody coating operation and baking of the coats thus formed which comprises indirectly cooling said exhaust air to a temperature between 20° and 80° C. and removing condensate, feeding the resultant cooled exhaust air to a fixed bed of activated carbon having a particle size in the range of about 2 to 6 mm, a bulk density of 300 to 350 g/l and a BET surface area of 800 to 1800 square meters per gram, removing at least a part of the adsorbate by subjecting the activated carbon laden with organic pollutants to a desorbing treatment by contacting said bed of activated carbon with steam and maintaining said bed at a temperature of 100° to 150° C. during said treatment, the pollutants desorbed from said activated carbon having a modal boiling point of 160° to 200° C., at least 60% of the desorbed pollutants having a boiling point of at least 170° C.

2. A process of claim 1, wherein the steam required per hour amounts to 50 to 300 kg per square meter of surface area of said bed of activated carbon.

3. A process of claim 6, wherein during the desorbing treatment said bed of activated carbon is maintained at a temperature between 105° and 120° C.

4. A process of claim 1, wherein the BET surface area of the activated carbon is about 1300 square meters per gram.

* * * * *